United States Patent

[11] 3,580,287

| [72] | Inventor | William I. McLaughlin |
| --- | --- | --- |
| | | Littleton, Colo. |
| [21] | Appl. No. | 798,087 |
| [22] | Filed | Feb. 10, 1969 |
| [45] | Patented | May 25, 1971 |
| [73] | Assignee | C. A. Norgren Co. |
| | | Littleton, Colo. |

[54] DIRECTIONAL CONTROL VALVE
9 Claims, 3 Drawing Figs.

| [52] | U.S. Cl. | 137/625.69 |
| --- | --- | --- |
| [51] | Int. Cl. | F16k 11/07 |
| [50] | Field of Search | 137/625.69, 1, 15, 625.66; 251/31, 628, 368 |

[56] References Cited
UNITED STATES PATENTS

| 701,574 | 6/1902 | King | 137/625.69 |
| --- | --- | --- | --- |
| 2,920,650 | 1/1960 | Moog, Jr. | 137/625.69 |
| 3,089,509 | 5/1963 | Collins | 137/625.69X |
| 3,349,800 | 10/1967 | Herion et al. | 137/625.66 |

FOREIGN PATENTS

| 1,044,271 | 10/1951 | France | 251/368 |
| --- | --- | --- | --- |

Primary Examiner—M. Cary Nelson
Assistant Examiner—Robert J. Miller
Attorney—Sheridan & Ross ABSTRACT: A spool-type valve and process of making same characterized by a ceramic spool member and ceramic sleeve which slidably receives same, the sleeve being bonded to the bore of a valve housing by an annular elastomeric wall which may be internally stressed between its bonded surfaces to prevent distortion of the sleeve in the event of temperature differences between the housing and sleeve or due to age warping of the housing. Since the elastomeric material is applied by injection and may fill an annular space of variable radial width, the dimension and finish of the housing bore and outer surface of the sleeve need not be held to critical tolerances.

Patented May 25, 1971 3,580,287

INVENTOR.
WILLIAM I. McLAUGHLIN
BY Sheridan and Ross

ATTORNEYS

DIRECTIONAL CONTROL VALVE

BACKGROUND OF THE INVENTION

Spool-type valves for controlling flow of fluids are of a myriad of sorts, but in general, comprise a spool member slidable in a bore, the bore containing axially spaced apertures for effecting the desired valving. In certain refinements, the bore referred to is in a sleeve suitably sealed within a bore in a valve housing. When employed for controlling flow of gas, such as air, certain surfaces must be fabricated to close dimensional tolerances and high degree of surface smoothness to prevent leakage, if packings are to be avoided. It has also been recognized that it is desirable to construct a valve housing of easily machinable material and construct the slidable spool and its surrounding sleeve of hard wear resistant material. This has created problems regarding the optimum manner of securing and sealing the sleeve within the housing. The U.S. Pat. No. 3,152,614 to Carls is exemplary of one solution to this problem, the sleeve being sealed by O-rings which engage the housing bore and sleeve, the sleeve and spool member being formed of hard corrosion and wear-resistant steel. Materials are known, however, which are harder and more corrosion and wear resistant than steel, exemplary of which are certain ceramic materials. While they may be easily initially shaped while plastic and before firing, they are difficult to finish thereafter, this being usually accomplished by grinding, lapping or honing with cutting agents such as diamond or other extremely hard abrasives. Any extensive machining after firing is virtually impossible if reasonable manufacturing costs are to be maintained.

It thus becomes apparent that if ceramic materials could be employed with a minimum amount of finishing operations and sealed to a housing with a simple seal which could be effective with wider tolerances of the housing bore and finish of same and also wider tolerances of the outside dimensions and finish of the sleeve, the use of such materials could be economically feasible, resulting in improvements in such type of valve. As will more fully appear, the principal objective of this invention is to provide a valve embodying the concepts and improvements referred to.

DESCRIPTION OF THE PREFERRED EMBODIMENT

Figure 1:
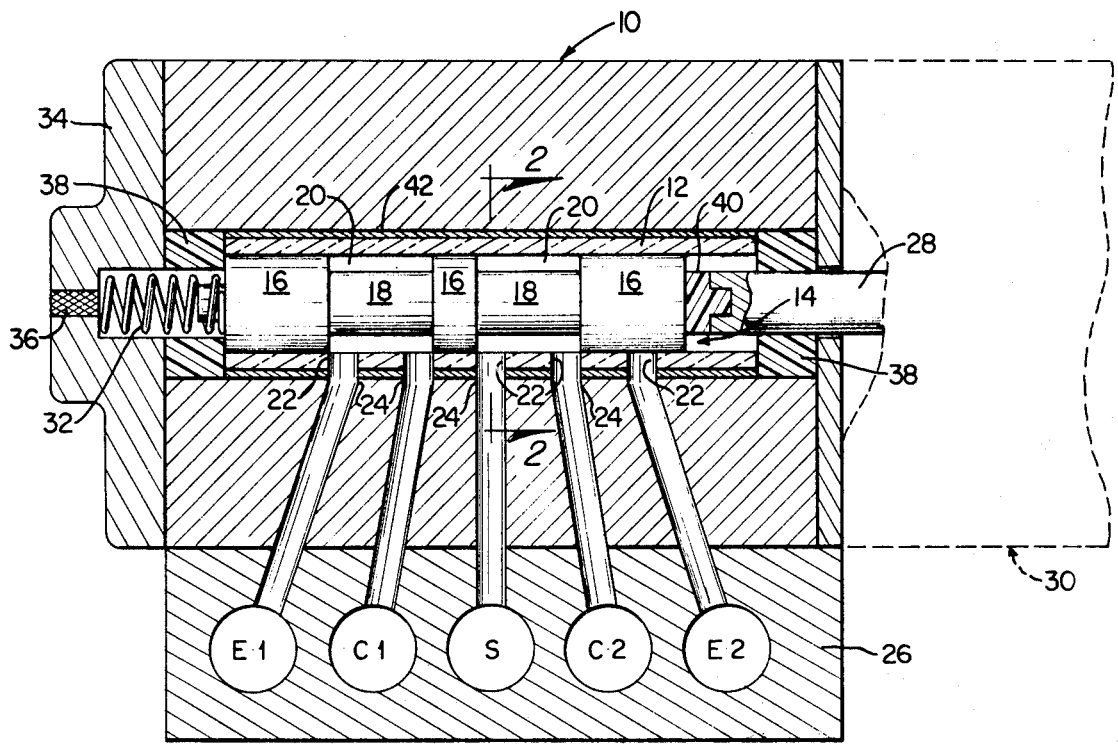
FIG. 1 is a longitudinal central section through apparatus forming the subject of the invention.
Figures 2, 3:
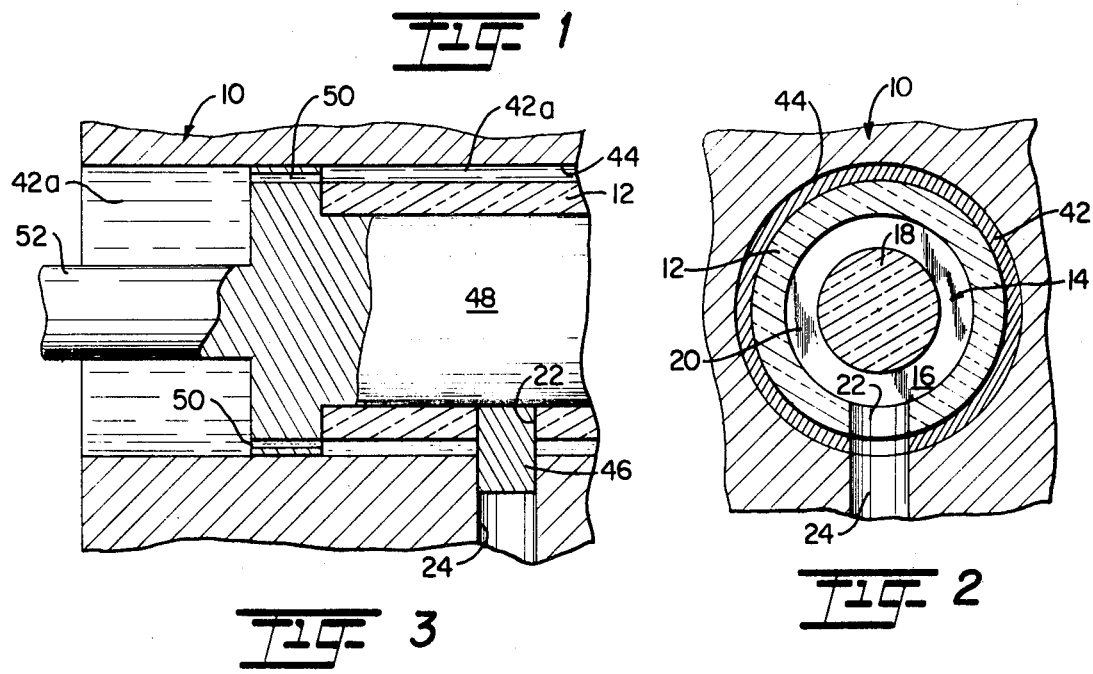
FIG. 2 is an enlarged section taken on line 2-2, FIG. 1.
FIG. 3 illustrates process for fabricating the apparatus.

Referring first to FIGS. 1 and 2, the subject of the invention is of conventional construction to the extent that it employs a valve body or housing 10, containing sleeve 12, and a spool member 14 axially slidable within the sleeve, the previously referred to patent disclosing this general arrangement of parts. Spool member 14 is also conventional in that it is provided with a plurality of axially spaced lands 16 connected by neck portions 18, providing axially spaced annular spaces 20 between the lands. Spaced apertures 22, such as transverse slots, extend through the wall of the sleeve which are aligned with like apertures 24 in the valve body which communicate with a manifold 26 to which is affixed the various conduits which communicate with an air-operated device, such as a double-acting cylinder-type actuator (not shown). As illustrated, the valve is of the two-position type having a central fluid supply port S, a port $C_1$, communicating with one end of the cylinder, a port $c_2$ communicating with the other end of same and a pair of exhaust ports $E_1$, $E_2$. In the position shown, supply port S communicates with a cylinder end $C_2$ while cylinder end $C_1$ is exhausting to atmosphere through exhaust port $E_1$. When the spool member is moved to a corresponding limit position to the right, cylinder end $C_2$ is exhausting to atmosphere through exhaust port $E_2$ while cylinder end $C_1$ is receiving fluid from source S, such valving arrangement being conventional.

Movement of the spool member to the left position shown is effected by a pushrod or stem 28 affixed to any suitable type actuator 30 such as a solenoid, while movement to the right position is effected by a spring 32, the ends of which abut the spool member and a removable cap 34. Cap 34 may contain a filter 36, such as sintered bronze, which serves as a metering orifice through which air may pass between the atmosphere and the left end of the spool member. Annular end bumpers or stops 38 of plastic material, such as Delrin, are preferably provided to cushion the spool member when it reaches its end positions of movement. A bumper 40 of like material may also be disposed at one of actuator stem 28.

The general construction and manner of operation of a two-position spool valve having been described, the principal novel departures from same will now be set forth in detail.

Sleeve 12 is constructed of a ceramic material, the bore of which is finished, such as by lapping, to an extremely smooth surface and close tolerance of diameter and straightness. One material, alumina, which meets these desired criteria is manufactured by Coors Porcelain Company of Golden, Colo. and identified as AD94.

The spool member is constructed of the same material and finished to like smoothness and tolerance. The sliding fit within the sleeve is such that minute leakage may occur across the lands with dry air but which are substantially sealed when oil mist is added to the air supply, this being conventional practice for providing lubrication to the air-operated instrumentality.

The sleeve is secured to the bore of the body member by elastomeric material 42, which provides a semifloating resilient support or cushion for the sleeve which aids in minimizing undesired stresses in the sleeve, particularly when a temperature differential exists between the sleeve and housing or in event the housing should warp slightly from its original dimensions. The material chosen should bond to the housing and sleeve to provide a seal between adjacent air passages. As will more fully appear, the material must be an injectable fluid and subject to chemical change upon curing. A material found satisfactory for this purpose is polyurethane. Another satisfactory material is Buna N (nitile) marketed under such trade names as Chemigum, Butaprene, Paracril and Hycar. Polyvinyl chloride foam is another example.

FIG. 3 illustrates one manner of disposing the sleeve in desired position within the valve body 10 to effect the structure previously described. Sleeve 12 is first disposed in body bore 44 and plugs 46 (only one of which is shown), of a shape corresponding to the shape of the sleeve aperture 22 and aligned body aperture 24, are inserted into each pair of aligned apertures which plugs flow of material through same and provides a core extending across the clearance space between the valve body and sleeve. This also axially aligns the corresponding apertures in the sleeve and valve body. The ends of the sleeve are then plugged, one plug 48 being shown which is also constructed to engage the body bore and locate the axis of the sleeve coincident with the axis of the body bore. This now fixes the position of the sleeve such that the clearance surrounding same is uniform. The injectable material 42a is then injected under pressure into one end of the body bore, flows through suitable apertures 50 in the plug and vents through like apertures in a like plug at the other end of the sleeve. After curing, the plugs may be removed in any suitable manner, such as by a pulling member 52 attached to each which will rupture material disposed in apertures 50 and strip the material from the bore of the body member. Stops 46 are then removed, leaving aligned sets of passages through the sleeve, the cured injected material and the body member.

It is to be understood that this invention is not limited to the exact embodiments of the methods and apparatuses shown and described, which are merely by way of illustration and not limitation, as various other forms and modifications will be apparent to those skilled in the art, and it is therefore intended that the appended claims cover all such changes and modifications.

I claim:

1. A fluid control valve comprising;

a. a metallic housing having a circular bore therein;
b. a circular sleeve of ceramic material disposed within the housing bore, its outer surface being disposed radially inwardly from the housing bore to provide a space surrounding same;
c. a spool valve member of ceramic material disposed within the bore of the sleeve having at least one land slidably engaging the bore of the sleeve;
d. an elastomeric material disposed within said space and bonded to the housing bore and the outer surface of the sleeve, the sleeve adapted to float slightly with respect to the housing as permitted by internal stressing of the elastomeric material;
e. said elastomeric material being of a type which may be injected in fluid form into said space and chemically cured therein; and
f. at least one pair of aligned apertures extending through the wall of the sleeve and through the elastomeric material for communicating the bore of the sleeve with an aligned port in the housing.

2. A valve in accordance with claim 1 wherein the longitudinal axes of the housing bore and sleeve are substantially coincident, whereby said space is of substantially uniform radial width.

3. A valve in accordance with claim 1 wherein the ceramic material is principally alumina.

4. A valve in accordance with claim 1 wherein the elastomeric material is polyurethane.

5. A valve in accordance with claim 1 wherein the elastomeric material is Buna N.

6. A valve in accordance with claim 1 wherein the elastomeric material is polyvinyl chloride.

7. A valve in accordance with claim 1 including removable plugs for closing the ends of the bore of the sleeve and said pair of aligned apertures to prevent entry of elastomeric material into the latter and into the bore of the sleeve during injection and curing of same.

8. A valve in accordance with claim 7 including means for supporting the sleeve with its longitudinal axis substantially coincident with the longitudinal axis of the bore of the housing.

9. A fluid control valve comprising:
a. a metallic housing having a circular bore therein;
b. a circular sleeve of ceramic material disposed within the housing bore, its outer surface being disposed radially inwardly from the housing bore to provide a space surrounding same;
c. a spool valve member of ceramic material disposed within the bore of the sleeve having at least one land slidably engaging the bore of the sleeve;
d. an elastomeric material disposed within said space and bonded to the housing bore and the outer surface of the sleeve, the sleeve adapted to float slightly with respect to the housing as permitted by internal stressing of the elastomeric material; and
e. at least one pair of aligned apertures extending through the wall of the sleeve and through the elastomeric material for communicating the bore of the sleeve with an aligned port in the housing.